United States Patent [19]
Czopor

[11] 3,798,724
[45] Mar. 26, 1974

[54] LOCKING ARRANGEMENT FOR CUTTING BLADE INSERTS

[75] Inventor: Edmund J. Czopor, Bloomfield Hills, Mich.

[73] Assignee: Gorham Tool Company, Detroit, Mich.

[22] Filed: July 28, 1972

[21] Appl. No.: 276,074

[52] U.S. Cl. .................................. 29/105 R, 29/96
[51] Int. Cl. ........................................... B26d 1/12
[58] Field of Search ............... 29/105 R, 105 A, 96; 269/235, 204

[56] References Cited
UNITED STATES PATENTS

| 1,109,031 | 9/1914 | Bersted | 29/96 |
| 760,021 | 5/1904 | Sandherr | 29/96 |
| 1,351,148 | 8/1920 | Alexander | 269/204 |

FOREIGN PATENTS OR APPLICATIONS

| 961,235 | 3/1957 | Germany | 29/105 |
| 492,864 | 7/1919 | France | 29/96 |

Primary Examiner—Andrew R. Juhasz
Assistant Examiner—W. R. Briggs
Attorney, Agent, or Firm—Barnes, Kisselle, Raisch & Choate

[57] ABSTRACT

An arrangement for locking a cutter blade insert on a milling cutter body. A bore in the cutter body adjacent a recess into which a cutting blade is inserted has a portion of its side wall intercepting the recess. A cam lock is mounted for rotation within the bore by journalling the reduced cylindrical end shafts thereof within the bore. The cam lock has a cam intermediate the shaft ends which is disposed within the bore adjacent the intersection of the bore and the recess. When the cam is actuated to a locking position after a blade is inserted into the recess, it wedges the blade in the recess thereby securely locking the same to the cutter body.

6 Claims, 12 Drawing Figures

LOCKING ARRANGEMENT FOR CUTTING BLADE INSERTS

This invention relates to cutting tools and more particularly to an improved blade locking arrangement for a milling cutter of the inserted blade type.

An important advantage of inserted blade cutters resides in the capability of replacing chipped or worn cutting edges individually without replacing the entire cutter. In cutters of this type it is therefore important not only to have a locking arrangement which permits blades to be easily replaced, but also one in which the blade may be securely locked to the cutter body.

It is an object of the present invention to provide a locking arrangement for inserted cutting blades which may be conveniently actuated from a non-locking position, in which a blade may be replaced, to a locking position, in which a large locking force is developed to securely lock an inserted blade to the cutter body.

Another object of the invention is to provide an improved locking arrangement wherein the blade may be manually locked with a high mechanical advantage, thereby providing an increased locking force on the blade.

A further object is to provide a cutter with a locking arrangement which is of especially sturdy and durable construction.

A further object of the invention is to provide a blade locking arrangement for an inserted blade type cutter which is designed for economy in manufacture.

Other objects and advantages of the invention will become apparent from the following description and drawings in which.

Figure 3:
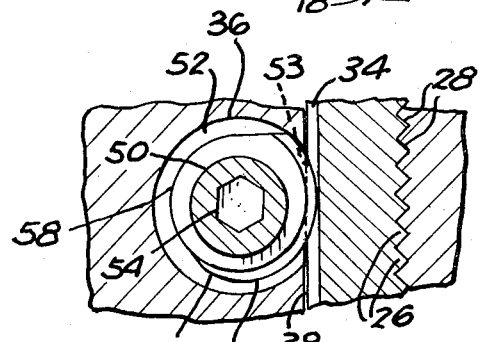
FIG. 3 is a sectional view taken substantially along line 3—3 in FIG. 2.
Figure 4:
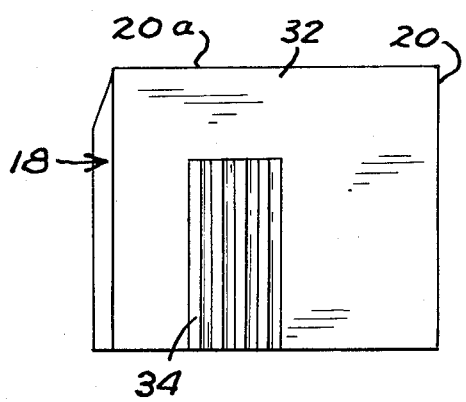
FIG. 4 is a view of the leading face of one of the blade inserts of FIG. 1.

Referring to FIGS. 1 through 4, a cutter 10 of the face mill type has a generally disc-like body 12 provided with a central keyed bore 14 for mounting to the spindle of a machine tool. A plurality of eight recesses, or slots, 16 are circumferentially spaced around the periphery of body 12. In the illustrated cutter slots 16 incline both radially and axially, but their particular inclinations, if any, will depend upon the particular design of inserted blade cutter. A cutting blade insert 18 is inserted into each slot 16 and has a sharp cutting edge 20 which extends generally radially of the cutter and which is spaced forwardly of the front face 22 of body 12. The radially outer end of the cutter is also ground with a sharp cutting edge 20a. The trailing face 24 (FIG. 2) of each blade insert 18 is fashioned with a plurality of axial serrations 26 which engage corresponding serrations 28 formed in the trailing side wall 30 of each slot 16. Serrations 26 extend across the full width of face 24 and serrations 28 extend across the full width of side wall 30 and permit inserts 18 to be axially slid into slots 16 from either the front or rear faces of the cutter. Serrations 26 and 28 thus allow each insert 18 to be incrementally positioned in the radial direction by appropriate alignment of the serrations preparatory to sliding the insert into the slot. As best seen in FIG. 4, the leading face 32 of each insert is fashioned with a plurality of radially extending serrations 34. Serrations 34 extend radially outwardly from the radially inner end of the insert, but as will be seen, need not extend to the radially outer edge thereof. Serrations 34 protrude outwardly beyond the plane of the leading face 32 and the thickness of the insert as measured from its trailing face 24 to the crests of serrations 34 is only slightly less than the width of slot 16 to permit the insert to be readily slid axially into the slot with serrations 26, 28 intermeshed.

Adjacent each slot 16 at the leading face thereof (in the counterclockwise direction as viewed in FIG. 1) a circular bore 36 extends through the cutter body parallel to the plane of the slot. The axis of bore 36 is spaced circumferentially from the leading wall 38 of slot 16 a distance less than the radius of bore 36 so that a portion of the circular periphery of bore 36 intersects the leading wall 38 of the slot to form a narrow, rectangular, chordal opening between bore 36 and slot 16 which extends from the rear face 40 of the cutter body forwardly to a shoulder 42 (FIG. 2). Shoulder 42 is provided at the forward end of bore 36 by a counterbore 44 which extends through to front face 22 of the cutter. The plane of the opening between bore 36 and slot 16 is parallel to the axis of the bore and in a transverse section through bore 36 (FIG. 3) appears as a chord of the circular cross section of bore 36.

Figure 2:
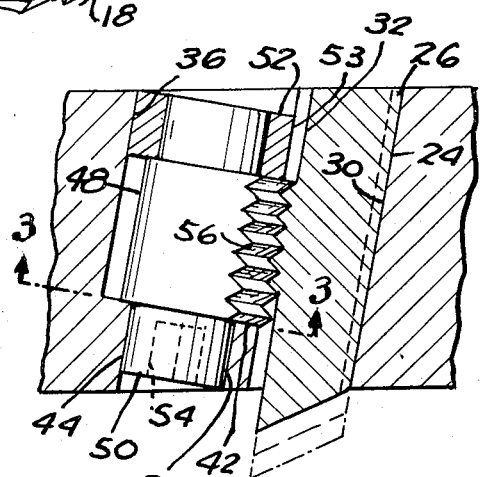
FIG. 2 is an enlarged sectional view taken along line 2—2 in FIG. 1.
Figure 2A:
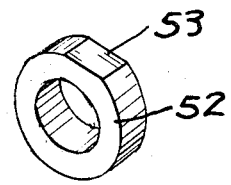
FIG. 2a is a perspective view of the bushing used in the assembly.

A cam lock 46 is journalled within bore 36 and serves to lock the inserted blade to the cutter body. Lock 46 comprises a cam 48 on a cam shaft 50. The opposite ends of shaft 50 are of smooth cylindrical shape with the forward shaft end being journalled within counterbore 44, and the rear shaft end within a circular bushing 52 which is pressed into the rear end of bore 36 and serves to axially constrain cam lock 46. Adjacent the leading wall 38 of each slot 16 the outer periphery of each bushing is flattened as at 53 so that the flattened portion lies on the plane of the leading wall 38 of the slot (FIGS. 2 and 2a).

Figure 1:
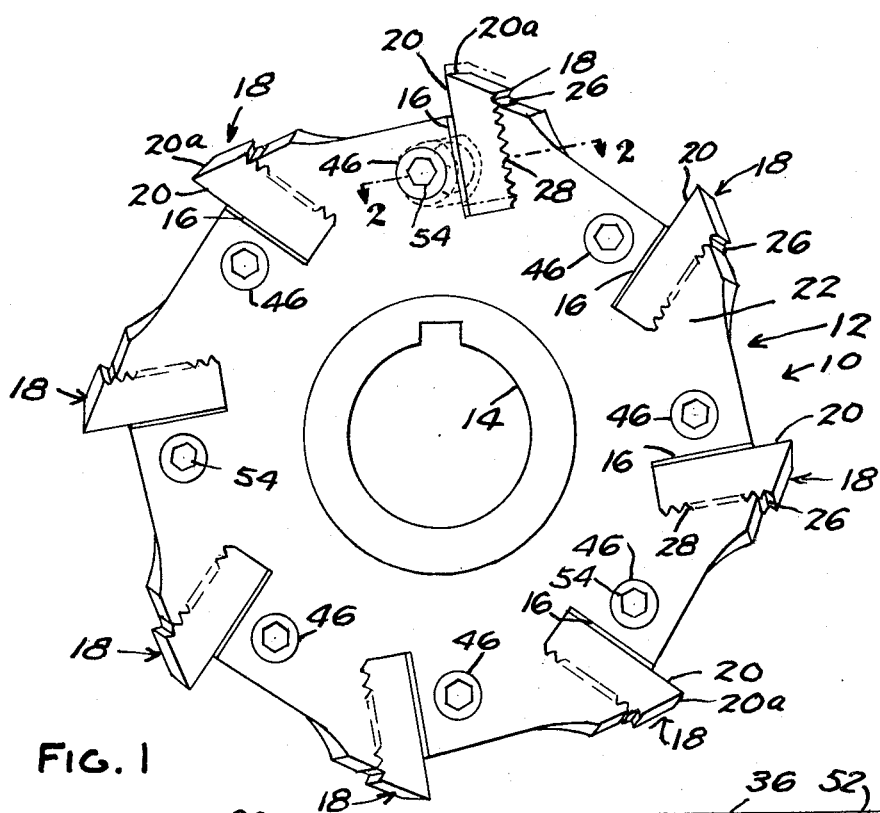
FIG. 1 is a side elevational view of an inserted blade cutter having the improved blade locking arrangement of the present invention.

As can be seen in FIGS. 1 and 3, the forward end of shaft 50 has a hexagonal socket 54 which may be engaged by an Allen wrench to rotate cam 48 into and out of locking engagement with the inserted blade. As best seen in FIGS. 2 and 3, which illustrate the locking position, cam 48 comprises a circumferentially serrrated cam surface 56 which meshes with radial serrations 34 of the insert. More specifically, serrations 56 are parallel to each other and perpendicular to the axis of the cam lock. Serrations 56 are of a uniform cross section (best shown in FIG. 2) and spiral radially outwardly with an increasing radius in the counterclockwise direction as viewed in FIG. 3. The spiral of serrations 56 is generated about the central axis of rotation of lock cam 46. In the illustrated embodiment, the angular extent of serrations 56 is slightly less than 180° but may be made greater desired as will be seen in the second embodiment hereinafter. An angular segment of the cam (for example, that designated generally 58 in FIG. 3) is dimensioned to a radius which is less than the radial distance from the plane of the slot wall 38 to the axis of the cam lock. This permits the insert to be slid out of the slot after the cam is rotated in the counterclockwise direction to the release position wherein segment 58 is spaced slightly from face 32 of the insert. From the release or nonlocking position cam 48 is actuated to the locking position by rotating shaft 50 in the clockwise direction as viewed in FIG. 3 to thereby move the increasing radius of the cam into wedging engagement with insert 18. The rate of rise in the cam produces a locking action and the insert is thereby securely locked both radially and axially in slot 16. The interengaged serrations on the cam and the insert assist the wedging engagement of the cam on the insert by reacting axial thrusts imposed on the insert during cutting.

Figure 5:
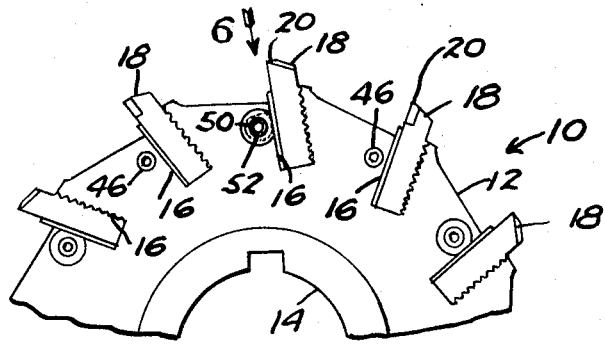
FIG. 5 is a fragmentary side elevational view of an inserted blade cutter which embodies another form of the improved blade locking arrangement of the present invention.
Figure 6:
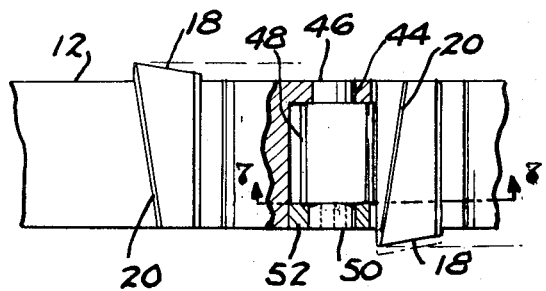
FIG. 6 is an enlarged fragmentary view taken in the direction of arrow 6 in FIG. 5 and having a portion broken away.
Figure 7:
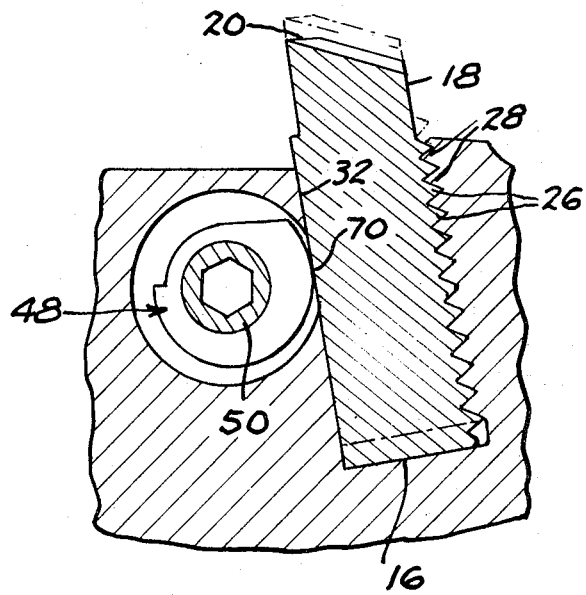
FIG. 7 is an enlarged sectional view substantially taken along line 7—7 in FIG. 6 with the end bushing removed.

The embodiment of the invention shown in FIGS. 5 through 7 is shown for a cutter of the staggered tooth, plain milling type wherein parts similar to those in FIGS. 1 through 4 are designated by like numerals.

In this embodiment the cutting edge 20a of each insert extends generally axially and the cutting edge 20 extends radially. As best seen in FIG. 6, the cutting edges 20a of adjacent inserts are ground so as to incline alternately in opposite directions from the axial direction and are spaced radially outwardly of the cutter body. In the case of cutter bodies of thin section the locking arrangements for adjacent inserts are alternated axially (bushings 52 of adjacent cam locks are on oppostie faces of the cutter) and, hence, are accessible for actuation from opposite faces of the cutter. While this alternate arrangement tends to prevent warping of the cutter body, it is to be appreciated that such an arrangement is merely exemplary of one particular cutter and that the locking arrangements can be arranged in various manners as desired. In this embodiment, cam 48 is provided with a smooth cam surface 70 which is adapted to forcibly engage the smooth leading face 32 of each insert for wedging the insert within the slot. As can be seen in FIG. 7, the cam surface 70 spirals radially outwardly in the counterclockwise direction and has an angular extent which is substantially greater than 180°. Because the rise in the cam is gradual and distributed over a relatively large angular extent an increased mechanical advantage is afforded when actuating the cam into locking engagement with the insert. Thus, a greater locking force may be developed to lock the blade to the cutter for a given amount of input torque to the cam shaft.

Figure 8:
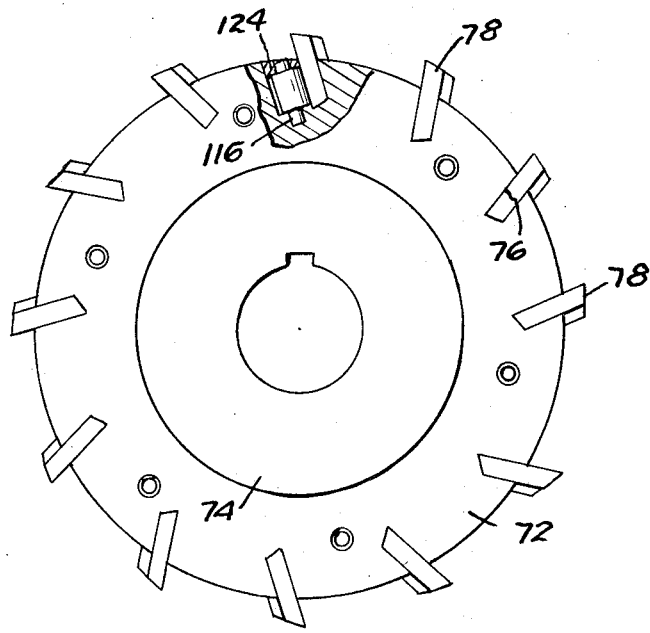
FIG. 8 is a side elevational view of another form of cutter embodying the present invention with the stop ring removed.
Figure 9:
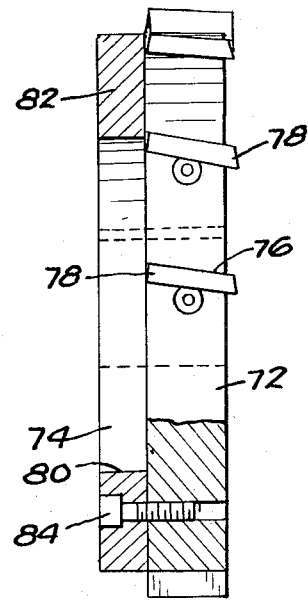
FIG. 9 is an end view of the cutter shown in FIG. 8 with parts broken away.

The arrangement shown in FIGS. 8 and 9 includes a cutter body in the form of a disc 72 having a central outwardly projecting hub 74 on one side thereof. The slots 76 for the cutting blades 78 are in general similar to those described in the previous embodiments, except that neither the blades nor the side walls of the slots are serrated. However, the locking means for blades 78 in the embodiments illustrated in FIGS. 8 and 9 extend generally radially on the leading side of each blade 78 as distinguished from axially as in the previously described embodiments. In addition, in the arrangement shown in FIGS. 8 and 9 hub 74 defines a cylindrical shoulder 80 concentric to the axis of rotation of body 72 and spaced radially inwardly from the inner ends of slots 76. A stop ring 82 is mounted on hub 74 so that it radially overlaps the rear ends of slots 76. Stop ring 82 may be mounted on body 72 by screws 84. Thus, in the arrangement shown in FIG. 9 the blades of the milling cutter are accurately positioned axially of the cutter so that, assuming that all of the blades are initially ground to the same size, the cutting edges 86 will lie in a flat plane perpendicular to the axis of rotation of the cutter body.

Figure 11:
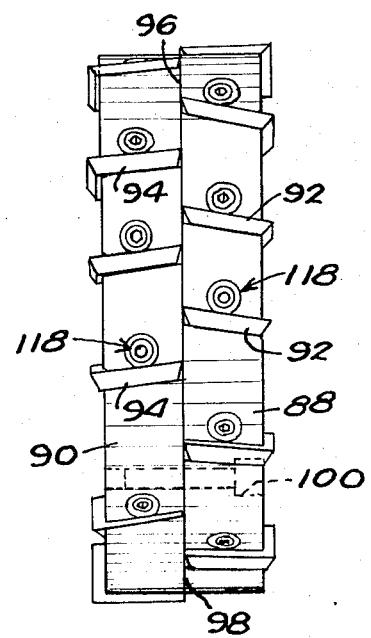
FIG. 11 is an end view of still another form of cutter embodying the present invention.

In FIG. 11 axial location of all of the blades is obtained by mounting two cutter bodies 88, 90 in back-to-back relation with the cutter blades 92 on cutter body 88 circumferentially staggered relative to the cutter blades 94 on body 90. Thus, the two coplanar faces 96, 98 of cutter bodies 88, 90, respectively, form the axial stop faces for blades 94, 92 respectively. The two cutter bodies may be secured together by any suitable means (such as screws 100).

Figure 10:
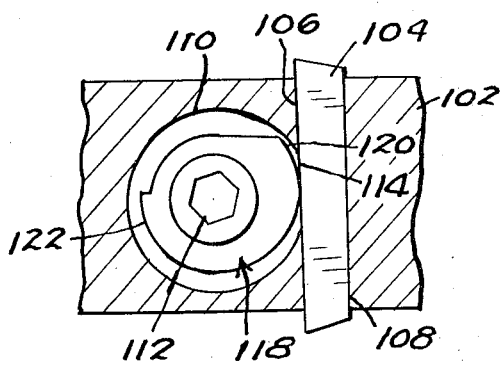
FIG. 10 is a sectional view of a further form of cutter embodying the present invention.

It will be noted that in the arrangement shown in FIGS. 8, 9 and 11 the locking means for the cutter blades extend generally radially of the cutter body rather than axially. The specific structure employed in this type of arrangement is illustrated in connection with the cutter shown in FIG. 10. In the latter arrangement the cutter body is designated 102 and is provided with a plurality of radially extending slots to accommodate the cutter blades 104. The blade slots have a front wall 106 and a rear wall 108 dimensioned to permit insertion of the blades 104 therein with a close fit. On the leading side of each blade 104 body 102 is formed with a bore 110, the axis of which is parallel to the plane of faces 106, 108 of the blade slots. However, the axis of bore 110 (which is designated 112) is spaced forwardly of the leading face of the blade slot a distance less than the radius of bore 110. Accordingly, bore 110 intercepts the leading face 106 of the blade slot to form a generally rectangular opening 114.

The inner end of bore 110 is counterbored to a smaller diameter such as shown at 116 in FIG. 8. Within bore 110 there is arranged a cam 118 which for all intents and purposes is substantially the same as cam 48 shown in FIG. 7. The high side 120 of cam 118 is adapted to extend rearwardly of the leading face 106 of the blade slot while the low side 122 of the cam is spaced radially from the axis thereof a distance less than the distance between the axis of bore 110 and the leading face 106 of the blade slot. Cam 118 is permanently rotatably mounted in bore 110 by means of a bushing 124 (FIG. 8) which for all intents and purposes is similar to the bushing shown in FIG. 2a. The cam lock arrangement illustrated in FIGS. 8 through 11, in other words, is substantially the same, both structurally and functionally, as the cam locks previously described, but are radially oriented rather than axially oriented. The cutter blades are clamped and released in substantially the same manner as previously described. To insert the blade into the blade slot cam 118 is rotated within bore 110 so that the low side 122 of the cam is adjacent the blade slot. After the blade 104 is properly positioned within the slot, cam 118 is rotated in a clockwise direction by means of a suitable wrench to lock the blade securely in the blade slot.

In the illustrated embodiments of the invention it is to be observed that by journalling both ends of the cam shaft within the cutter body the locking force is reacted at both ends of the shaft. The construction is therefore sturdy and durable. A further advantage is that the cam remains axially fixed while being actuated, as contrasted to the other types of locking arrangements which utilize threaded shafts, wedges, etc. Thus, in the locking arrangement of the present invention, as the cam surface is brought into wedging engagement with the leading face of the insert, there is theoretically no axial component of force against the cam (as would result from axial movement of the cam within the bore) which could tend to reduce the net locking force developed on the insert for a given input torque to the cam shaft. By reason of the fact that the cam surface is generated about the axis of rotation of the cam, the cam rise is more gradual than the same size cam in the form of a cylinder with an offset axis of rotation. It should also be noted that the assembly is intended to be permanent and, thus, in the course of normal usage, it is not possible to have the lock fall out and become lost.

I claim:

1. In a cutting tool the combination comprising, a body having a generally rectangularly shaped recess therein adapted to receive a cutting blade, said recess having generally parallel spaced side walls defining a generally rectangularly shaped slot at at least one face of said body, said body having a circular cylindrical bore therein extending to said one face thereof adjacent said slot, the axis of said bore being disposed intermediate opposite ends of the recess and being spaced radially from the adjacent side of said recess a distance less than the radius of the bore such that the intersection of the recess and bore defines a generally rectangularly shaped chordal opening between the recess and bore, a blade locking element in said bore comprising a rotatable shaft disposed coaxially in said bore, the opposite end portions of said shaft having a radius less then the radial distance between the axis of said bore and the plane of said opening, a cam fixed on said shaft intermediate said ends, said cam having a cam surface extending peripherally around the axis of the shaft, said cam surface having a low side spaced radially from the axis of the bore a distance not greater than the radial distance between the axis of the bore and the plane of said opening, said cam surface also having a high side spaced radially from the axis of the bore a distance not greater than the radius of the bore but greater than the radial distance between the axis of the bore and the plane of said opening such that when the shaft is rotated said high side of the cam surface is adapted to project through said chordal opening into said recess into wedging engagement with a cutting blade seated therein, said bore having means at one end thereof forming a reduced diameter bore portion in which one end of the shaft is journalled and a bushing at the other end of said bore in which the other end of the shaft is journalled, said bushing being disposed at said one face of the body and having an outer diameter corresponding to the diameter of said bore, the peripheral portion of the bushing adjacent said slot being flat and substantially coplanar with said chordal opening.

2. The combination set forth in claim 1 wherein said bushing is fixedly retained in said last-mentioned end of said bore.

3. The combination set forth in claim 1 wherein said bushing is press fitted into said last-mentioned end of said bore.

4. The combination set forth in claim 1 wherein said bore is counterbored at said one end thereof to form said reduced diameter bore portion.

5. The combination set forth in claim 1 wherein said body is of generally circular shape and has opposite side faces, said one face of said body comprising one of said opposite side faces and said bore extending generally parallel to the central axis of said body.

6. The combination set forth in claim 1 wherein said body is of generally circular shape, said recess extending radially inwardly from the outer periphery of said body so that said one face of the body comprises the outer peripheral surface of the body, said bore extending generally radially inwardly of said body from said outer peripheral surface.

* * * * *